United States Patent [19]

Takei et al.

[11] Patent Number: 5,500,261
[45] Date of Patent: Mar. 19, 1996

[54] RESIN COMPOSITION AND A CONTAINER

[75] Inventors: Shinobu Takei, Kanagawa; Shoji Ohtani, Tochigi; Hiroaki Iwasaki, Tochigi; Tetsuhiro Ohsawa, Tochigi; Yasunori Hosokowa, Wakayama, all of Japan

[73] Assignee: Kao Corporation, Tokyo, Japan

[21] Appl. No.: 468,086

[22] Filed: Jun. 6, 1995

Related U.S. Application Data

[63] Continuation of Ser. No. 313,536, Sep. 27, 1994, abandoned, which is a continuation of Ser. No. 107,207, Aug. 16, 1993, abandoned, which is a continuation-in-part of Ser. No. 887,184, May 20, 1992, abandoned.

[30] Foreign Application Priority Data

May 24, 1991 [JP] Japan ............................ 3-119823
Apr. 15, 1992 [JP] Japan ............................ 4-94720

[51] Int. Cl.$^6$ ............................ B65D 23/02; B65D 23/08; C08L 67/02
[52] U.S. Cl. ............................ 428/35.7; 428/36.9; 525/444
[58] Field of Search ............................ 525/444; 428/35.7, 428/36.92; 215/1 C

[56] References Cited

U.S. PATENT DOCUMENTS

| | | | |
|---|---|---|---|
| 3,382,295 | 5/1968 | Taylor | 427/314 |
| 4,150,987 | 4/1979 | Anderson | 96/1.5 R |
| 4,381,337 | 4/1983 | Chang | 430/58 |
| 4,578,437 | 3/1986 | Light | 525/444 |
| 4,846,359 | 7/1989 | Baird | 215/12 |
| 4,900,610 | 2/1990 | Hochberg | 428/195 |
| 5,409,750 | 4/1995 | Hamada | 428/35.7 |

*Primary Examiner*—Joseph L. Schofer
*Assistant Examiner*—I. Zemel
*Attorney, Agent, or Firm*—Oblon, Spivak, McClelland, Maier, & Neustadt

[57] ABSTRACT

A resin composition which is a suitable component of a container which is superior in oil resistance and not deformed or swelled, even by oily filled contents in preservations. Additionally, the container made of the resin composition is superior in flexibility, squeezing capability, pressing out capability, pinch off adhesion capability, and heat sealing capability. According to this invention, there is provided a blended resin composition comprising at least one kind of a first polyester resin selected from the group consisting of amorphous polyester resins and polyester resin having a peak area of not more than 20mJ/g, which has a glass-transition temperature not less than 50° C. and at least one kind of a second polyester resin which has a glass-transition temperature not more than 40° C. The first polyester resin has a first peak representing a temperature dependency of tan δ. The second polyester resin has a second peak representing said temperature dependency of tan δ. The first peak of the first polyester resin is located at a higher temperature than the second peak of the second polyester resin. The blended resin composition has a third peak and a fourth peak. The third and fourth peaks of the blended resin composition are located at a lower temperature than the first peak. The third and fourth peaks of the blended resin composition are located at a higher temperature than the second peak.

15 Claims, 3 Drawing Sheets

RESIN COMPOSITION AND A CONTAINER

This application is a continuation of application Ser. No. 08/313,536, filed on Sep. 27, 1994, which was a Continuation of application Ser. No. 08/107,207, filed on Aug. 16, 1993, which was a Continuation-in-Part of application Ser. No. 07/887,184, filed on May 20, 1992, all now abandoned.

BACKGROUND OF THE INVENTION

This invention relates to a resin composition and a container made of the resin composition. The resin composition is one that is a suitable component of a container which contains items of skin care, hair care, other cosmetics, foods, and other items.

One example of the prior art uses a mono-layer or a multi-layer polyolefin-type resin as a component of hollow containers. The polyolefin-type resin exhibits good extruding capability and adhesion capability in the part where the container is pinched off. Another example of the prior art uses a polyolefin-type resin, which has good extruding capability and heat sealing capability, as a component of an inside layer of tube shaped containers. Prior art containers which have a multi-layer structure use a polyolefin-type resin for the inner-most layer. When the polyolefin-type resin is used for the inner-most layer, it increases the pinch off adhesion and heat sealing capability of the container. Examples of the polyolefin-type resin include high density polyethylene, low density polyethylene, linear low density polyethylene, random co-polypropylene, and block copolypropylene.

The above-recited prior art polyolefin-type resins do not provide a suitable gas barrier or oil resistance. To overcome this drawback, Japanese Patent Publication Nos. 43074/1976, 23792/1981, and 15532/1982, and Japanese Laid-open Patent No. 49939/1985 attempt to provide a barrier resin such as ethylene vinyl alcohol copolymer and nylons to prevent the invasion of oxygen gas from the environment and the infiltration of oily components.

Prior art containers which contain a polyolefin-type resin have problems when carrying items of skin care, hair care, other cosmetics, and foods which have oily components. These oily components include various kinds of animal oil and vegetable oil and their ester interchange derivatives, synthetic oils, like isoparafin, and silicon oil. These oily components infiltrate into the resin of the polyolefin, which is a component of the containers. When the container has a mono-layer wall of a polyolefin-type resin, the oily components bleed out the surface of the container. When the container has a multi-layer structure with a barrier resin in the middle layers and the inner-most layer is a polyolefin-type resin, the inner-most layer absorbs the oily components and swells. As a result, the container is deformed by the bimetallic effects. Most items carried in the above-mentioned container are 50–60% oily components. However, this drawback is a greater problem when the item carried in the container is 80–90% oily components.

In recent years, blending flavors such as menthol and mints and other aromatics, vitamin E, and various extracts has become popular. These components also infiltrate or permeate into the inner layer materials of the containers or they are absorbed by the inner layer materials, and thus, reduce the amount of those components in the item carried in the container. Therefore, the effect of blending decreases and the expected effect is lost.

Japanese Patent Publication No. 26008/1985 and Japanese Laid-open Patent No. 219646/1990 try to solve the above-mentioned problems using an ethylene vinyl alcohol copolymer for the inner-most layer of a tube-shaped container. Japanese Patent Publication Nos. 84877/1976, 92880/1976, and 53817/1987, and Japanese Laid-open Patent No. 50260/1988 try to solve the above-mentioned problems using nylon or polyethyleneterephthalate resin.

The above-recited prior art does prevent the container from absorbing the oil. However, the materials, which the above-mentioned prior art uses to make the container, are inferior in pinch off adhesion capability and heat sealing capability.

An additional drawback in using ethylene vinyl alcohol copolymer, nylon or polyethyleneterephthalate resin for the inner-most layer of the container is that the container lacks flexibility. Thus, characteristics of a container made of a polyolefin type resin, such as flexibility and ease of squeezing the contents out, cannot be expected. This disadvantage in turn leads to a decrease in the value of the container by almost half. Additionally, advantages of using a plastic container, such as its resistance to breaking and the ease of squeezing or pressing out the contents of a tubular container, are lost, and thus, the value of the container is cut by half.

When a container is made of multiple layers of nylons, polyethyleneterephthalate resin, and polyolefin-type resins, the manufacturing process is difficult because the optimum processing temperatures of each layer are different from the others. Additionally, when the production process uses force to bring the multiple layers together the container is deformed because of the differences of the coefficients of contraction of each layer.

See U.S. Pat. No. 4381337 which discloses a blended resin selected from a polyester resin having a high Tg and a polyester resin having a low Tg.

See also, U.S. Pat. No. 3382295 which discloses a blended resin selected from an amorphous resin with a high Tg value and one selected from an amorphous polyester resin with a low Tg value.

SUMMARY OF THE INVENTION

The object of this invention is to provide a resin composition and a container. The resin composition is a suitable component of the container which is superior in oil resistance and is not deformed or swelled by oily contents of preservations. Additionally, the container of the present invention has superior flexibility, squeezing capability, pressing out capability, pinch off adhesion capability, and heat sealing capability.

According to an embodiment of the present invention, there is provided a blended resin composition comprising at least one kind of a first polyester resin selected from the group consisting of amorphous polyester resins and polyester resin having a peak area of not more than 20mJ/g, which has a glass-transition temperature not less than 50° C. and at least one kind of a second polyester resin which has a glass-transition temperature not more than 40° C. The first polyester resin has a first peak representing a temperature dependency of tan δ. The second polyester resin has a second peak representing said temperature dependency of tan δ. The first peak of the first polyester resin is located at a higher temperature than the second peak of the second polyester resin. The blended resin composition has a third peak and a fourth peak. The third and fourth peaks of the blended resin composition are located at a lower temperature than the first peak. The third and fourth peaks of the blended resin composition are located at a higher temperature than the second peak.

The glass transition temperature (Tg) of the first resin selected from a group of polyester resin of amorphous (non-crystallinity) or low-crystallinity is preferably less than about 60° C. The glass transition temperature (Tg) of the second resin is preferably not more than about 30° C. and more preferably not more than about 20° C.

The resin composition contains 10–95 weight % of the first resin, preferably 20–80 weight %, and more preferably 30–70 weight %. The resin composition contains 90–5 weight % of the second resin, preferably 80–20 weight %, and more preferably 70–30 weight %.

According to a feature of the invention, there is provided a blended resin composition comprising at least one kind of resin selected from a group of polyester resin and polyamide resin of amorphous (non-crystallinity) or low- crystallinity and which has a high glass transition temperature, and at least one kind of crystalline or non-crystalline resin selected from a group of polyester resin and polyamide resin which has a low glass transition temperature and which has a temperature dependency of tan δ, which is gained by dynamic viscoelasticity measurement of the blended resin, which has two peaks.

It is preferable that the position of the two peaks of temperature dependency of tan δ, which is gained by dynamic viscoelasticity measurement of the blended resin, is located in a lower temperature side than the position of the peak of temperature dependency of tan δ, which is gained by dynamic viscoelasticity measurement of the first resin of amorphous (non-crystallinity) or low-crystallinity, which has a high glass-transition temperature, and is located in a higher temperature side than the position of the peak of temperature dependency of tan δ, which is gained by dynamic viscoelasticity measurement of the second resin, which has a low glass transition temperature. It is also preferable that one of the peaks of temperature dependency of tan δ, which is gained by dynamic viscoelasticity measurement of the blended resin, is located in a lower temperature side than room temperature and another peak is located in a higher temperature side than room temperature.

A more preferable blended resin composition of the present invention comprises at least one kind of resin selected from a group of polyester resin of amorphous or low-crystallinity and which has a glass transition temperature of not less than about 50° C., and at least one kind of low-crystalline or amorphous resin selected from a group of polyester resin which has a glass transition temperature of not more than about 40° C. and the temperature dependency of tan δ, which is gained by dynamic viscoelasticity measurement of the blended resin, has two peaks.

The resin composition of the present invention is superior in oil resistance and is not deformed or swelled by oily contents in the container in preservations. Additionally, it has superior flexibility, squeezing capability, pressing out capability, pinch off adhesion capability, and heat sealing capability. A container made of the resin composition of the present invention can hold items of skin care, hair care, other cosmetics, and foods which have oily components. These oily components include various kinds of animal oil and vegetable oil and their ester interchange derivatives, synthetic oils, like isoparafin, silicon oil, and oils for various flavors such as menthol and mints and other aromatics, vitamin E and various extracts. The resin composition of this invention is especially good for extruding, superior in melting adhesions, and is flexible. Additionally, a superior container is produced when it is made from the resin composition of the present invention combined with a polyolefin-type resin.

By contrast, in a blended resin composition of two kinds of polyester resins, as disclosed in U.S. Pat. Nos. 4,381,337 and 3,382,295, the blended resin does not exhibit two peaks. In cases where the polyester resin A and polyester resin B are solved with each other, the ester interchange reaction between the resins is such that it speeds up the reaction between them, resulting in a single peak. This property in turn produces inferior containers.

Moreover, it is difficult to predict the blending compositions of the two polyester resins which comprise the blended resin of the prior art blended resins, which would yield two peaks. In order to produce two peaks, one would have to initially determine the blending compositions, blend the resins, and then examine whether the blended resin produces two peaks. Only then, would one use the blended resin of the prior art, in order to produce superior quality blended resins which in turn would produce superior containers.

In this invention the glass transition temperature (Tg) is measured with a differential scanning calorimeter (DC-22 made by Seiko Instruments Inc.) by holding a sample, which is melted at 240° C. and immediately cooled to 20° C., for 10 minutes at a temperature 30° C. higher than the melting point, and then immediately cooling it to a temperature 50° C. lower than the glass transition temperature, and holding it for 10 minutes. The glass transition temperature (Tg) is measured in the temperature rising speed in 20° C./min. The degree of crystallinity of the sample is decided from the size of the peak area, which is measured by the peak on crystallinity melting in the temperature rising speed of 10° C./min. of the sample which is held at first for 10 minutes at a temperature 30° C. higher than the melting point, and then immediately cooled to a temperature 50° C. lower than the melting temperature and held for 10 minutes. A low-crystalline resin has a peak area of not more than 20mJ/g on a DC measurement chart. A non-crystalline resin has a peak area of not more than 5mJ/g. Additionally, the sample which is melted in 240° C. and immediately cooled to 20° C. is measured with a dynamic viscoelasticity measurement equipment (RSA-II made by Rheometrics Far East Ltd. which is used under the following conditions of frequency: 1Hz, strain: 0.1%, measurement temperature range: −100° C. to 140° C., at each 3° C. interval, temperature holding time: 1 minute).

DETAILED DESCRIPTION OF THE PREFERRED EMBODIMENTS

Figure 1:
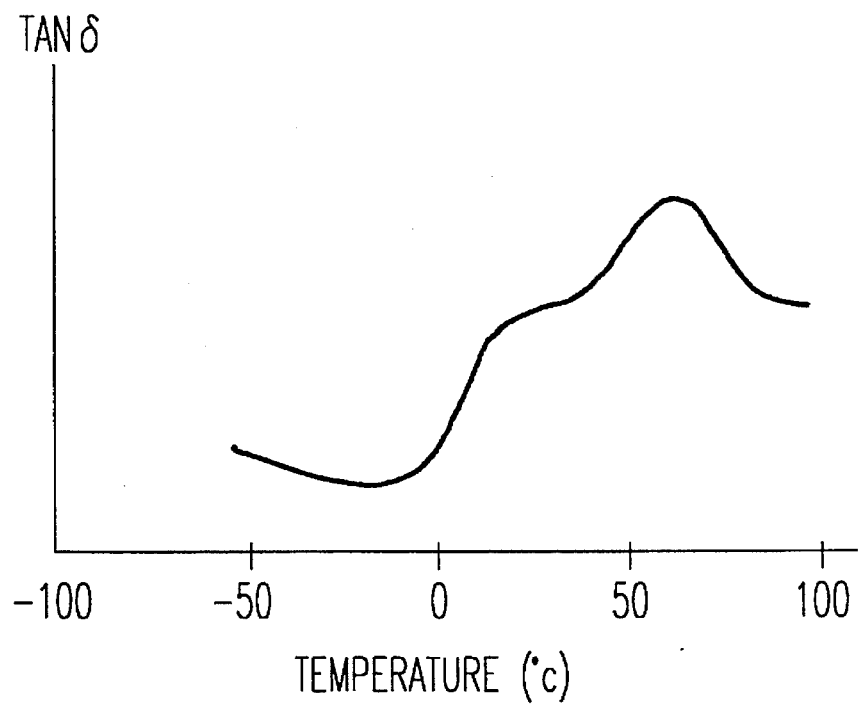
FIG. 1 is a graph showing the temperature dependency of tan δ of the blended resin in Embodiment 1.

The first resin in the blended resin composition is at least one kind of resin selected from the group of polyester resin of amorphous or low-crystallinity and which has a high glass-transition temperature (Tg). The second resin in the blended resin composition is at least one kind of resin selected from the group of polyester resin and has a low glass-transition temperature (Tg). The temperature dependency of tan δ, which is gained by dynamic viscoelasticity measurement of the blended resin, has two peaks. The resin which has a high Tg and the resin which has a low Tg are not solved for each other, but are separated.

In each temperature dependency of tan δ of a simple polyester resin or a simple polyamide resin before it is blended, only one peak exists at the temperature caused by each Tg. The position of a peak, which is caused by the Tg of a simple polyester resin which has a high Tg, and which is in a higher temperature of the two peaks of tan δ of the blended resin, shifts to a slightly lower temperature when blended with a polyester resin which has a low Tg. Another position of a peak, which is caused by the Tg of a simple polyester resin which has a low Tg, and which is in a lower temperature of the two peaks of tan δ of the blended resin, shifts to a slightly higher temperature when blended with a polyester resin which has a high Tg.

It is believed that the reason why the position of two peaks in temperature dependency of tan δ of the blended resin shifts from the positions of respective simple resins before they are blended is that an ester interchange reaction, between the polyester resin, which has a high Tg, and the polyester resin which has a low Tg.

Polyester resin which has a high Tg is superior in fabrication, such as when using an extrusion process which uses a screw. However, it is very rigid near room temperature because of its high glass-transition temperature(Tg). When using the above resins to make a container which requires squeezing capability, the container lacks flexibility. In contrast, polyester resin or polyamide resin which has a low Tg has superior flexibility because of its low glass-transition temperature(Tg), but its fabrication capability is inferior. For example, polyester resin or polyamide resin, which has a low Tg is difficult to extrude by a screw because of the low melt viscosity of the resin.

The blended resin composition of the present invention has superior fabrication capability because it uses a polyester resin, which has a high glass-transition temperature (Tg), and a polyester resin, which has a low glass-transition temperature (Tg). The blended resins are separated from each other so that their respective characteristics compensate for each other. As a result the resin composition has superior pinch off adhesion capability and heat sealing capability because it is superior in melt adhesions, and it has suitable flexibility. Additionally, when the resin composition of the present invention is combined with a polyolefin-type resin a superior container can be produced which has superior oil resistance.

A Polyester resin which has a high Tg, such as a polyester resin which has a Tg of not less than 50° C., can include at least one kind of dicarboxylic acid component selected from the group of isophthalic acid, isophthalic acid derivatives, terephthalic acid, and terephthalic acid derivatives, and at least one kind of glycol component selected from a group of ethyleneglycol and cyclohexanedimethanol. A preferred combination of the dicarboxylic component and the glycol component is a system of terephthalic acid ethyleneglycol-cyclohexanedimethanol or a system of isophthalic acid-terephthalic acid-ethyleneglycol. A preferred mole ratio of the polymer in the system of terephthalic acid-ethyleneglycolcyclohexanedimethanol is that the portion of ethyleneglycol is 60 to 90 and the portion of cyclohexanedimethanol is 40 to 10 in comparison with terephthalic acid 100. A preferred mole ratio of the polymer in the system of isophthalic acid-terephthalic acid-ethyleneglycol is that the portion of terephthalic acid is 5 to 30 and the portion of isophthalic acid is 70 to 95 in comparison with ethyleneglycol 100. It is possible to use other components for this purpose in a small quantity.

Polyester resin which has a low Tg, such as polyester resin which has a Tg of not more than about 40° C., includes at least one kind of dicarboxylic acid component selected from a group of terephthalic acid, isophthalic acid, succinic acid, guitar acid, adipic acid, pimelic acid, suberic acid, azelaic acid, sebacic acid, nonamethylenedicarboxylic acid, decamethylenedicarboxylic acid, cyclopropanedicarboxylic acid, cyclobutanedicarboxylic acid, cyclopentanedicarboxylic acid, cyclohexanedicarboxylic acid, and these derivatives, especially at least one kind of resin selected from a group of aliphatic dicarboxylic acid and its derivative such as succinic acid, guitar acid, adipic acid, pimelic acid, suberic acid, azelaic acid, sebacic acid, nonamethylenedicarboxylic acid, decamethylenedicarboxylic acid, and at least one kind of glycol component selected from a group of ethyleneglycol, diethyleneglycol, propyleneglycol, butyleneglycol, hexanediol, neopentylglycol, polyethyleneglycol, cyclohexanedimethanol, hydroquinone, resorcinol, especially aliphatic or alicyclic glycol having the carbon number 3 or more such as diethyleneglycol, propyleneglycol, butyleneglycol, hexanediol, polyethyleneglycol, polytetramethyleneglycol, and cyclohexanedimethanol. It is also possible to use a hydroxy carboxylic acid component such as p-oxybenzoic acid instead of them. A preferred combination of the dicarboxylic acid component and glycol component is a polymer in combination of terephthalic acid-isophthalic acid-adipic acid, and butylene glycol. A preferred mole ratio of the polymer is 30 to 75:5 to 35:0 to 50:100. It is possible to use other components for this purpose in a small quantity.

When using the resin composition of this invention as a container materials it is possible to make a mono-layer type container (or a body of the container). It is preferable to use the blended resin of this invention for an inner-most layer of a multi-layer structure. It is possible to consider a variety of layered structures such as two kinds of resin/two layers(2R2L), three kinds of resin/three layers (3R3L), four kinds of resin/five layers (4R5L), as shown below. However, any structure can be adopted using the blended resin of this invention as the inner-most layer.

| outer-most layer/inner-most layer | |
|---|---|
| 2R2L | Polyolefin-type resin/The blended resin composition of this invention |
| 2R2L | The blended composition of polyolefin-type resin and adhesive resin/The blended resin composition of this invention |
| 3R3L | Polyolefin-type resin/Adhesive resin/The blended resin composition of this invention |
| 4R5L | Polyolefin-type resin/Adhesive resin/Gas barrier resin /Adhesive resin/The blended resin composition of this invention |

The polyolefin-type resin in the above examples is selected from the following: low density polyethylene resin (LDPE), linear chain low density polyethylene resin (LLDPE), high density polyethylene resin (HDPE), homopolypropylene, block co-polypropylene, and random co-polypropylene.

The adhesive resin in the above examples is selected from the following: the polyolefin-type resins recited above modified by an α,β-unsaturated acid anhydride, modified by an α,β-unsaturated ester, and modified by one of an epoxy compound and polymer, and ethylene vinyl acetate copolymer.

The gas barrier resin in the above examples is selected from the following: ethylene vinylalcoholcopolymer, MX nylon, polyacrylonitrile, and polyvinylidene chloride.

A preferred thickness of the inner-most layer, which is the blended resin composition of the present invention, is at least 5 μm for optimum oil resistance, and 20 μm is more preferred. A preferred thickness of the gas barrier resin layer is not more than 100 μm, and 50 μm is more preferred.

The blended resin composition of the present invention can be used to make a hollow container made by extrusion blow molding, also it can be used for a tube-shaped container, a pouch, or a flexible package by laminating the blended resin composition of the present invention to a sheet of aluminum foil, paper or resin.

Examples of items that may be carried in a container made with the blended resin composition of the present invention include, but are not limited to, the following: vegetable fat and oil such as soybean oil, cotton seed oil, corn oil, sesame oil, rape seed oil, olive oil, tsubaki oil, caster oil, palm oil, and coconut oil; animal fat and oil such as sardine oil, whale oil, bone oil, beef tallow, lard, mutton tallow, horse tallow, and butter tallow; a number of organic acids of carbon number 4 to 30 which are gained by hydrolyzing the above fats and oils such as caproic acid, caprice acid, lauric acid, oleic acid, linoleic acid, and stearic acid; hydrocarbons such as monoglyceride, diglyceride derivatives, synthetic organic acids, liquid paraffins, lamp oil, kerosene, naphtha, ligroin, cetene, octene, cetan, octane, decane, dodecane, and octadecane; a number of ester oils such as octyllaurate, dioctylphthalate, butyllaurylphthalate, dibutylphthalate, 2-ethylhexyllaurate, and isopropylpalmitate; a number of linear chain or branching alcohol of carbon number 4 to 30 such as octylalcohol, laurylalcohol, oleylalcohol, 2-ethylhexylalcohol, and gerbealcohol; a number of oil components such as mineral oil, lanolin, vaseline, beeswax, and polypropyleneglycol; a number of surfactants such aspolyoxyethlenesorbitanemonooleate, sorbitanemonolaurate, sorbitanemonopalmitate, sorbitanemonostearate, sorbitanedioleate, propyleneglycolmonolaurate, glycelylmonostearate, propyleneglycolmonostearate, ethleneglycolmonostearate, polyoxyethylenealkylphenylether, polyoxypropylenealkylether, especially an oily non ionic surfactant which has an HLB value of not more than 15; a number of skin lotions such as baby oil, emollient lotion, moisturizing lotion, massage lotion, and cleansing lotion; a number of skin creams, make-up base creams, vanishing creams, and emollient creams; cosmetic materials such as shaving cream, hair removers, split hair coating cream, and hair oil; a number of food products including flavors, cooking oil, salad oil, oily dressings such as Italian dressing, French dressing, mayonnaise; and a number of house maintenance goods such as floor wax.

Although embodiments of the present invention are described below, this invention is not limited to these embodiments.

EMBODIMENT 1

In the first embodiment the blended resin of this invention is made by blending 50 weight % of non-crystalline polyester resin (A), which has a Tg value of 81° C. and includes terephthalic acid, ethyleneglycol, and cyclohexanedimethanol in a mole ratio of 100:72:28 and 50 weight % of polyester resin (B), which has a Tg value of 1.0° C. and includes terephthalic acid, isophthalic acid, adipic acid, and butyleneglycol in a mole ratio of 47:29:24:100.

The blended resin of this invention is mixed and extruded with a biaxial extruder (Labo-plastmil: Basic apparatus; type 30-150, Measurement head; 2D25-S, Screw; Different direction outside rotation multiple screw; made by Toyo Seiki Seisakujo Corp.) when the cylinder preset temperature is 180°–220° C. and the number of screw rotations is 80 rpm. The strand of blended resin which is extruded is immediately cooled in a water tank, cut into pellets with a pelletizer, and suction dried at 30°–50° C. for a whole day and night. Then, this pellet blended resin is pressed at 200° C., quenched to 20° C., made into sheets, and cut in a way suitable for dynamic viscoelasticity measurement.

FIG. 1 shows the temperature dependency of tan δ of the blended resin of the first embodiment. The temperature dependency of tan δ of resin (B) is a single peak near 8° C. The temperature dependency of tan δ of resin (A) is a single peak near 85° C. However, the temperature dependency of tan δ of the blended resin of this invention shows two peaks. One peak near 23° C. is caused by resin (B) another peak near 63° C. is caused by resin (A).

When the blended resin of this invention is dyed, using a traditional method, and viewed with a transparent electron microscope, it is observed that the structure of this blended resin is a matrix-island structure and of a two-phase separation.

EMBODIMENT 2.

In the second embodiment of the present invention the blended resin is made by blending 70 weight % of amorphous (non-crystalline) polyester resin (A), which has a Tg value of 81° C. and includes terephthalic acid, ethyleneglycol, and cyclohexanedimethanol in a mole ratio of 100:72:28 with 30 weight % of polyester resin (B), which has a Tg value of –5.5° C. and includes terephthalic acid, isophthalic acid, adipic acid, and butyleneglycol in a mole ratio of 55:14:31:100.

Figure 2:
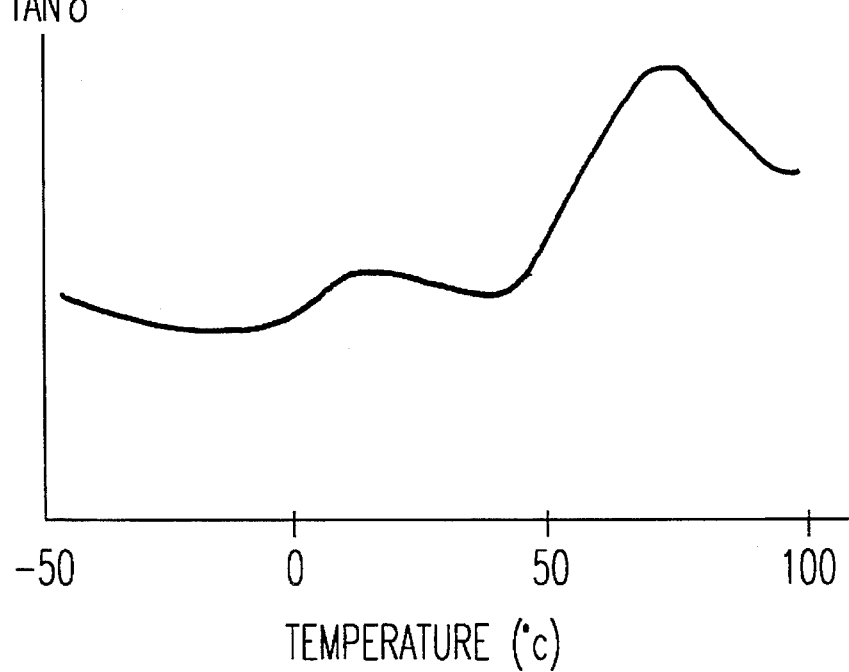
FIG. 2 is a graph showing the temperature dependency of tan δ of the blended resin in Embodiment 2.

A dynamic viscoelasticity measurement is performed for this blended resin in the same way the first embodiment was measured. FIG. 2 shows the temperature dependency of the tan δ. The temperature dependency of tan δ of resin (B) is a single peak near –3° C. The temperature dependency of tan δ of resin (A) is a single peak near 85° C. However, the temperature dependency of tan δ of the blended resin of this invention shows two peaks. One peak near 13° C. is caused by resin (B) another peak near 72° C. is caused by resin (A).

When the blended resin of the second embodiment is dyed, using a traditional method, and viewed with a transparent electron microscope, it is observed that the structure of this blended resin is a sea-island structure and of a two-phase separation.

EMBODIMENT 3

In the third embodiment of the present invention the blended resin is made by blending 50 weight % of non-crystalline polyester resin (A), which has a Tg value of 81° C. and includes terephthalic acid, ethyleneglycol, and cyclohexanedimethanol in a mole ratio of 100:72:28 with 50 weight % of polyester resin (B), which has a Tg value of –19.4° C. and includes terephthalic acid, isophthalic acid, adipic acid, and butyleneglycol in a mole ratio of 34:21:45:100.

Figure 3:
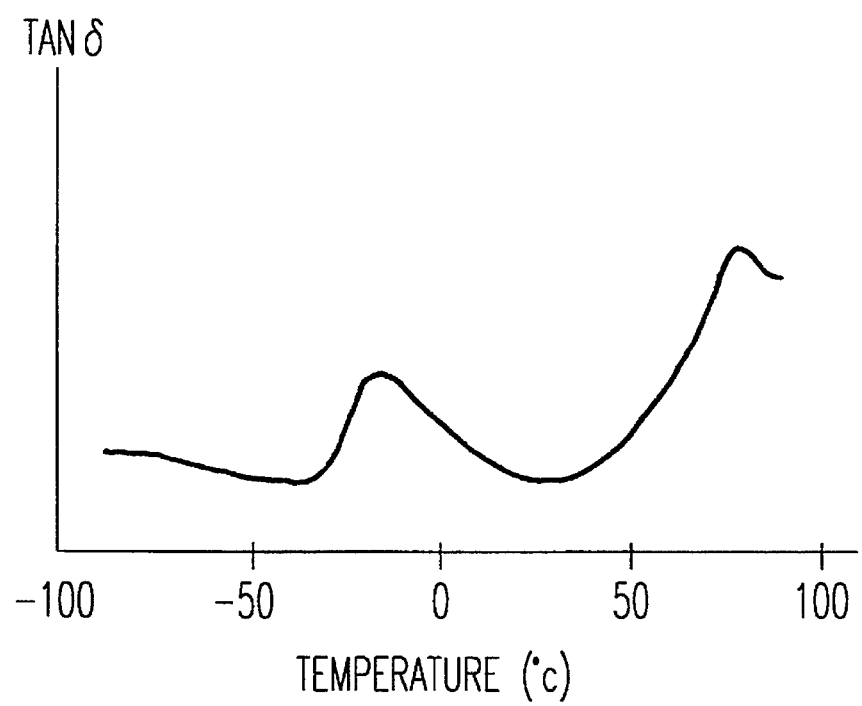
FIG. 3 is a graph showing the temperature dependency of tan δ of the blended resin in Embodiment 3.

A dynamic viscoelasticity measurement is performed for this blended resin in the same way the first embodiment was measured. FIG. 3 shows the temperature dependency of tan δ. The temperature dependency of tan δ of resin (B) is a single peak near −17° C. The temperature dependency of tan δ of resin (A) is a single peak near 85° C. However, the temperature dependency of tan δ of the blended resin of this invention shows two peaks. One peak near 15° C. is caused by resin (B) another peak near 78° C. is caused by resin (A).

When the blended resin of the third embodiment is dyed, using a traditional method, and viewed with a transparent electron microscope, it is observed that the structure of this blended resin is a sea-island structure and of a two-phase separation.

EMBODIMENT 4

In the fourth embodiment of the present invention the blended resin is made by blending 70 weight % of non-crystalline polyester resin (A), which has a Tg value of 62° C. and includes terephthalic acid, isophthalic acid, and ethyleneglycol in a mole ratio of 11:89:100 with 30 weight % of polyester resin (B), which has a Tg value of −5.5° C. and includes terephthalic acid, isophthalic acid, adipic acid, and butyleneglycol in a mole ratio of 55:14:31:100.

Figure 4:
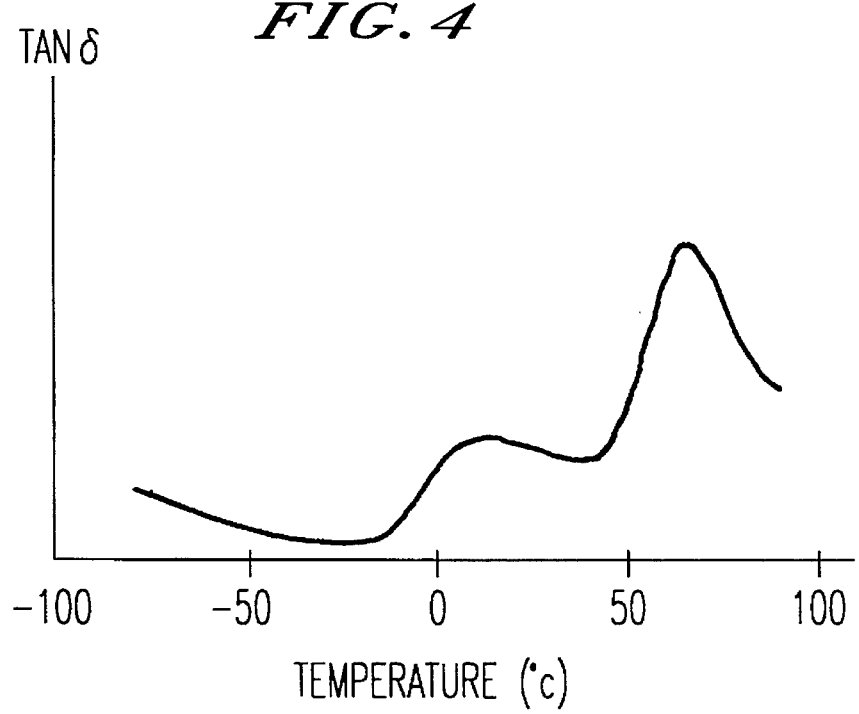
FIG. 4 is a graph showing the temperature dependency of tan δ of the blended resin in Embodiment 4.
Figure 5:
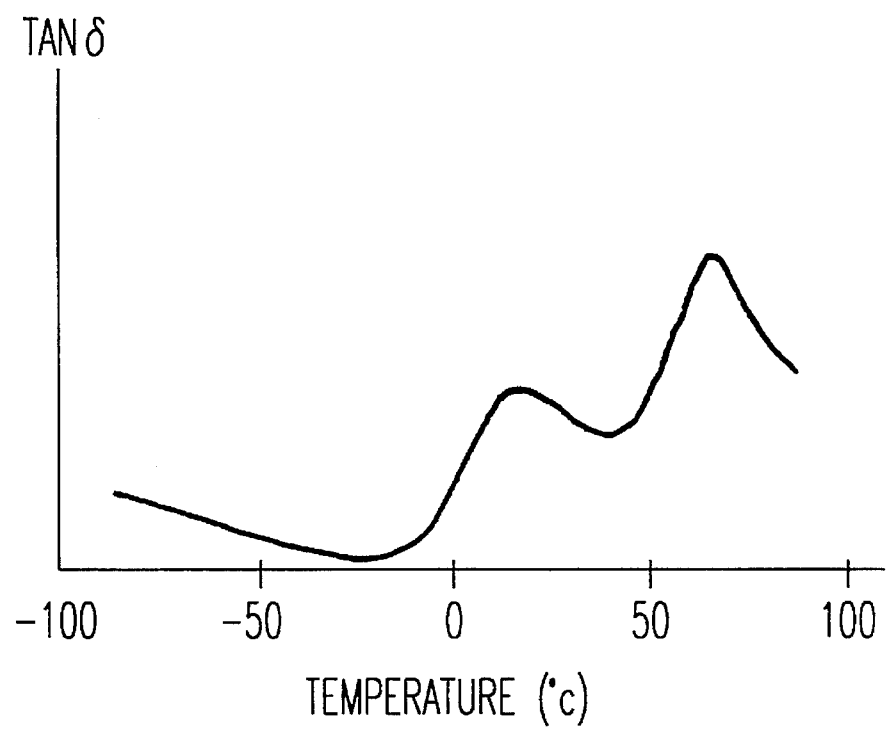
FIG. 5 is a graph showing the temperature dependency of tan δ of the blended resin in Embodiment 5.
Figure 6:
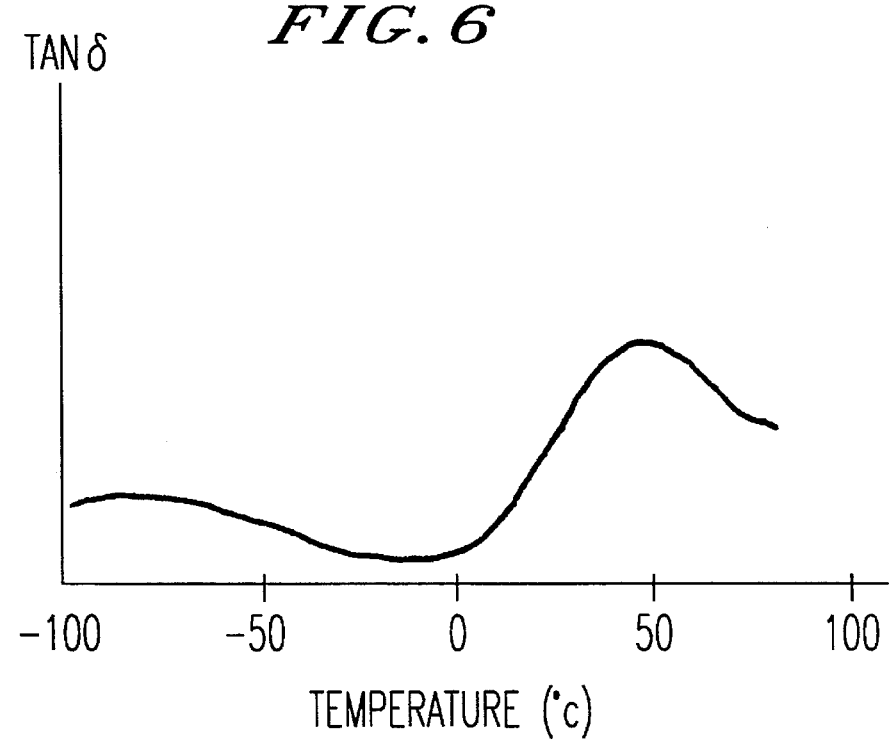
FIG. 6 is a graph showing the temperature dependency of tan δ of the blended resin in Comparison-1.

A dynamic viscoelasticity measurement is performed for this blended resin in the same way the first embodiment was measured. FIG. 4 shows the temperature dependency of the tan δ. The temperature dependency of tan δ of resin (B) is a single peak near −3° C. The temperature dependency of tan δ of resin (A) is a single peak near 69° C. However, the temperature dependency of tan δ of the blended resin of this invention shows two peaks. One peak near 10° C. is caused by resin (B) another peak near 65° C. is caused by resin (A).

When the blended resin of the fourth embodiment is dyed, using a traditional method, and viewed with a transparent electron microscope, it is observed that the structure of this blended resin is a sea-island structure and of a two-phase separation.

EMBODIMENT 5

In the fifth embodiment of the present invention the blended resin is made by blending 60 weight % of non-crystalline polyester resin (A), which has a Tg value of 62° C. and includes terephthalic acid, isophthalic acid, and ethyleneglycol in a mole ratio of 11:89:100 with 40 weight % of polyester resin (B), which has a Tg value of 1.0° C. and includes terephthalic acid, isophthalic acid, adipic acid, and butyleneglycol in a mole ratio of 47:29:24:100.

A dynamic viscoelasticity measurement is performed for this blended resin in the same way the first embodiment was measured. FIG. 4 shows the temperature dependency of the tan δ. The temperature dependency of tan δ of resin (B) is a single peak near 8° C. The temperature dependency of tan δ of resin (A) is a single peak near 69° C. However, the temperature dependency of tan δ of the blended resin of this invention shows two peaks. One peak near 16° C. is caused by resin (B) another peak near 65° C. is caused by resin (A).

When the blended resin of the fifth embodiment is dyed, using a traditional method, and viewed with a transparent electron microscope, it is observed that the structure of this blended resin is a sea-island structure and of a two-phase separation.

EMBODIMENT 6

In the sixth embodiment of the present invention a compressed bottle is manufactured where the outer-most layer is made of Sholex 5003 (HDPE, Showa Denko K. K.), the middle layer is made of Admer AT (adhesive polyolefin, made by Mitsui Petrochemical Industries, Ltd.), and the inner-most layer is the blended resin in the first embodiment. In the compressed bottle, the major axis is 65 mm, the minor axis is 35 mm, the content volume is 300 ml, the thickness of the outer-most layer is 450 μm, the thickness of the middle layer is 50 μm, and the thickness of the inner-most layer is 100 μm.

The compressed bottle is made using a direct blow molding machine which has a head for making multiple layers. First the melted resin is extruded and a cylindrical parison is formed. The cylinder temperature of the extruder, for the outer-most resin layer and the middle resin layer is from about 150°–210° C. The cylinder temperature of the extruder for the inner-most resin layer is from about 140°–200° C. Next, the parison is clamped with a mold and compressed air is blown into the parison to make the compressed bottle.

EMBODIMENT 7

In the seventh embodiment of the present invention, the compressed bottle of the sixth is made using the blended resin of the second embodiment instead of the blended resin of the sixth embodiment.

EMBODIMENT 8

In the eight embodiment of the present invention the compressed bottle of the sixth embodiment is made using the blended resin of the third embodiment instead of the blended resin of the sixth embodiment.

EMBODIMENT 9

In the ninth embodiment, a tube-shaped container with three layers and three different types of resin is formed using Mirason 50 (LDPE, made by Mitsui Petrochemical Industries, Ltd.) for the outer-most layer, Admer AT for the middle layer, and the blended resin of the first embodiment for the inner-most layer.

The tube-shaped container of the ninth embodiment is made using an internal inter-cooling mandrel co-extruder tube making machine. Each resin is extruded when the temperature of the extruder cylinder is from about 150°–180° C. As a result, a pipe-shaped molding made of three layers and three types of resin is produced having a diameter of 35 mm. The thickness of the outer-most layer is about 350 μm, of the middle layer is about 50 μm, and of the inner-most layer is about 50 μm. Then, the tube-shaped container is completed by cutting the pipe-shaped molding to 130 mm long, injecting the blended resin with a vertical-type injection molding machine, and forming a protrusion in an end of it which has threads for a screw top. The resulting tube-shaped container has a volume of about 120 ml.

EMBODIMENT 10

In the tenth embodiment a tube-shaped container is made which has five kinds of resin and five layers. The five kinds of resin and layers include low density polyethylene / Admer LF (adhesive polyolefin, made by Mitsui Petrochemical Industries, Ltd.) / Eval EP-E (ethylene-vinylalcohol copolymer, made by Kuraray) / Admer AT / the blended resin in the fourth embodiment.

EMBODIMENT 11

In the eleventh embodiment a laminated sheet which has three types of resin and three layers is made by laminating the blended resin of the fifth embodiment on a two layer sheet including a low density polyethylene layer and an adhesive layer with a T-type die extruder. The low density polyethylene layer is 40 μm thick, the adhesive layer is 20 μm thick, and the blended resin layer is 20 μm thick. A 10 cm square pouch is made by stacking two of the laminated sheets, made according to the nineteenth embodiment, so that their inner layers of blended polyester resin face each other, and heat-sealing three of the edges.

EMBODIMENT 12

In the twelfth embodiment a compressed bottle which has three types of resin and three layers is made using Sholex 5003 for the outer-most layer, Admer AT for the middle layer, and a polyester resin for the inner-most layer. The polyester resin is a blend of 60 weight % non-crystalline polyester resin, which has a Tg value of 81° C. and includes terephthalic acid, ethyleneglycol, and cyclohexanedimethanol in a mole ratio of 100:72:28 and 40 weight % polyester resin, which has a Tg value of 21° C. and includes terephthalic acid, isophthalic acid, and butyleneglycol in a mole ratio of 72:28:100. The compressed bottle has a 65 mm major axis, a 35 mm minor axis, and a content volume of 300 ml. The outer-most layer of the compressed bottle is 450 μm thick, the middle layer is 50 μm thick, and the inner-most layer is 100 μm thick.

The compressed bottle of the twelfth embodiment is made using a direct blow molding machine which has a head for making multiple layers. First, the melted resin is extruded and a cylindrical parison is formed. The cylinder temperature of the extruder for the outer-most resin layer and the middle resin layer is from about 150°–210° C. The cylinder temperature of the extruder for the inner-most resin layer resin is from about 140°–200° C. Next, the parison is clamped in a mold and compressed air is blown into it.

The blended resin of this invention is melted and blended with a biaxial extruder when the cylinder has a preset temperature of from about 200°–280° C. and the number of screw rotations is 50 rpm. Then the resin is extruded from the biaxial extruder, immediately cooled in a water tank, cut with a cutter, and suction dried at an ordinary temperature for a whole day and a night.

EMBODIMENT 13

In the thirteenth embodiment, the compressed bottle of the twelfth embodiment is made using a resin blend of 50 weight % non-crystalline polyester resin, which has a Tg value of 81° C. and includes terephthalic acid, ethyleneglycol, and cyclohexanedimethanol in a mole ratio of 100:72:28 and 50 weight % polyester resin, which has a Tg value of −5.5° C. and includes terephthalic acid, isophthalic acid, adipic acid, and butyleneglycol in a mole ratio of 55:14:31:100, instead of the blended resin of the twelfth embodiment.

EMBODIMENT 14

In the fourteenth, the compressed bottle of the thirteenth embodiment is made using the blended resin of the fourth embodiment instead of the blended resin of the twelfth embodiment.

EMBODIMENT 15

In the fifteenth embodiment, the compressed bottle of the twelfth embodiment is made using a resin blend of 50 weight % non-crystalline polyester resin, which has a Tg value of 62° C. and includes terephthalic acid, isophthalic acid, and ethyleneglycol in a mole ratio of 11:89:100 and 50 weight % polyester resin, which has a Tg value of 1.0° C. and includes terephthalic acid, isophthalic acid, adipic acid, and butyleneglycol in a mole ratio of 47:29:24:100, instead of the blended resin of the twelfth embodiment.

EMBODIMENT 16

In the sixteenth embodiment, the compressed bottle of the twelfth embodiment is made using a resin blend of 50 weight % low-crystalline polyester resin, which has a Tg value of 80° C. and includes terephthalic acid, ethyleneglycol, and cyclohexanedimethanol in a mole ratio of 100:85:15 and 50 weight % polyester resin, which has a Tg value of −5.5° C. and includes terephthalic acid, isophthalic acid, adipic acid, and butyleneglycol in a mole ratio of 55:14:31:100, instead of the blended resin of the twelfth embodiment. Additionally, Mirason 50 is used instead of Sholex 5003.

EMBODIMENT 17

In the seventeenth embodiment a 300 ml compressed bottle is made by directly blowing and forming a blended polyester resin. The polyester resin is a blend of 90 weight % non-crystalline polyester resin, which has a Tg value of 81° C. and includes terephthalic acid, ethyleneglycol, and cyclohexanedimethanol in a mole ratio of 100:72:28 and 10 weight % polyester resin, which has a Tg value of −5.5° C. and includes terephthalic acid, isophthalic acid, adipic acid, and butyleneglycol in a mole ratio of 55:14:31:100.

EMBODIMENT 18

In the eighteenth embodiment a tube-shaped container which has three types of resins and three layers is made using Mirason 50 for the outer-most layer, Admer AT for the middle layer, and a blended polyester resin for the inner-most layer. The blended polyester resin is 75 weight % non-crystalline polyester resin, which has a Tg value of 81° C. and includes terephthalic acid, ethyleneglycol, and cyclohexanedimethanol in a mole ratio of 100:72:28 and 25 weight % polyester resin, which has a Tg value of −5.5° C. and includes terephthalic acid, isophthalic acid, adipic acid, and butyleneglycol in a mole ratio of 55:14:31:100.

An internal inter-cooling mandrel co-extruder tube-making machine is used to make the tube-shaped container of the twenty-sixth embodiment. Each resin is extruded when the temperature of the extruder cylinder is from about 150°–180° C. to obtain a pipe-shaped molding with a diameter of 35 mm. The thicknesses of the respective layers of the pipe-shaped molding are 350 μm in the outer-most layer, 50 μm in the middle layer, and 50 μm in the inner-most layer. Then, the tube-shaped container is completed by cutting the pipe-shaped molding to 130 mm long, injecting the blended resin with a vertical-type injection molding machine, and forming a protrusion in an end of it which has threads for a screw top. The resulting tube-shaped container has a volume of about 120 ml.

EMBODIMENT 19

In the nineteenth embodiment, a pipe-shaped molding with five types of resin and five layers is made. The outer-most layer is Mirason 50. The inner-most layer is a blended polyester resin. The layers between the outer-most layer and the inner-most layer are Admer LF / Eval EP-E / Admer AT. The blended polyester resin is 60 weight % non crystalline polyester resin, which has a Tg value of 81° C. and includes terephthalic acid, ethyleneglycol, and cyclohexanedimethanol in a mole ratio of 100:72:28 and 40 weight % blended polyester resin, which has a Tg value of 1.0° C. and includes terephthalic acid, isophthalic acid, adipic acid, and butyleneglycol in a mole ratio of 47:29:24:100. The thicknesses of the respective layers are 300 μm, 40 μm, 20 μm, 40 μm, and 50 μm from the outer-most layer.

Then, the tube-shaped container is completed by cutting the pipe-shaped molding to 130 mm long, injecting Admer AT with a vertical-type injection molding machine, and forming a protrusion in an end of it which has threads for a screw top. The resulting tube-shaped container has a volume of about 120 ml.

EMBODIMENT 20

In the twentieth embodiment a laminated sheet having three types of resin and three layers is made. A blended polyester resin is laminated on a two-layer sheet, which has a LDPE layer and an adhesive layer, with a T-type die extruder. The blended polyester resin is 40 weight % non-crystalline polyester resin, which has a Tg value of 62° C. and includes terephthalic acid, isophthalic acid, and ethyleneglycol in a mole ratio of 11:89:100 and 60 weight % polyester resin, which has a Tg value of −5.5° C. and includes terephthalic acid, isophthalic acid, adipic acid, and butyleneglycol in a mole ratio of 55:14:31:100. The respective thicknesses of layers are 40 μm in the LDPE layer, 20 μm in the adhesive layer, and 20 μm in the blended polyester resin layer.

A 10cm square pouch is made by stacking two of the laminated sheets, of the twenty-eighth embodiment, so that their inner layers of blended polyester resin are facing each other, and heat sealing three of the edges.

Comparison 1

In this example a blended resin is made by blending 50 weight % of non-crystalline polyester resin (A), which has a Tg value of 81° C. and includes terephthalic acid, ethyleneglycol, and cyclohexanedimethanol in a mole ratio of 100:72:28 with 50 weight % of polyester resin (B) which has a Tg value of 21° C. and includes terephthalic acid, isophthalic acid, and ethyleneglycol in a mole ratio of 72:28:100.

A dynamic viscoelasticity measurement is performed for this blended resin in the same way the first embodiment was measured. FIG. 9 shows the temperature dependency of the tan δ. The temperature dependency of tan δ of resin (B) is a single peak near 25° C. The temperature dependency of tan δ of resin (A) is a single peak near 85° C. However, the temperature dependency of tan δ of the blended resin shows a broad peak near 45° C.

When the blended resin of the eighth embodiment is dyed, using a traditional method, and viewed with a transparent electron microscope, a homogenous figure is observed.

Comparison 2.

In this example a blended resin is made by blending 50 weight % of non-crystalline polyester resin (A), which has a Tg value of 81° C. with 50 weight % of polyester resin (B) which has a Tg value of 1.0° C.

The above blended resin is mixed and extruded with a biaxial extruder, similar to the one used in Embodiment 1, wherein the cylinder preset temperature is 220° C. to 250° C. and the number of screw rotations is 30 rpm. It should be noted that the staying time of the resin in the biaxial extruder was 1 (one) minute in embodiment 1, whereas the staying time of the resin in the biaxial extruder in this example is 3 (three) minutes.

The blended polymer thus obtained shows only one peak in the graph showing temperature dependency of tan δ. The peak is broad and located in the vicinity of 40° C.

Comparison 3

Comparison example 3 is a three layer flat bottle (three kinds of resin) bottle which is made in a way similar to the three layered flat bottle of the ninth embodiment except that the blended resin of Embodiment 9 is replaced by a blended resin as used in Comparison 1.

Comparison 4

Comparison example 4 is a three layer flat bottle (three kinds of resin) bottle which is made in a way similar to the three layered flat bottle of the ninth embodiment except that the blended resin of Embodiment 9 is replaced by a blended resin as used in Comparison 2.

Comparison 5

Comparison example 5 is a mono-layer compressed bottle of Mirason 50 which is made in a way similar to the compressed bottle of the sixth embodiment.

Comparison 6

Comparison example 6 is a mono-layer compressed bottle of Sholex 5003 which is made in a way similar to the compressed bottle of the sixth embodiment.

Comparison 7

Comparison example 7 is a three-layer compressed bottle which is made in a way similar to the compressed bottle of the sixth embodiment. The outer-most layer is Sholex 5003, the middle layer is Admer HB030 (an adhesive resin made by Mitsui Petrochemical Industries, Ltd.), and the inner-most layer is Eval EP-E.

Comparison 8

Comparison example 8 is a three-layer compressed bottle which is made in a way similar to the compressed bottle of the sixth embodiment. The outer-most layer is Sholex 5003D (high density polyethylene, made by Mitsui Petrochemical Industries, Ltd.). The middle layer is Admer AT. The inner-most layer is a copolymer polyester resin, which has a Tg value of 40° C. and includes terephthalic acid, isophthalic acid, adipic acid, ethyleneglycol, butyleneglycol, and cyclohexanedimethanol in a mole ratio of 147:29:24:72:100:28.

Comparison 9

Comparison example 9 is a multi-layer compressed bottle which is made in a way similar to the compressed bottle of the sixth embodiment. The outer-most layer is Sholex 5003. The middle layers are Admer HB030, Eval EP-E, and Admer LF500. The inner-most layer is Sholex 5003.

Comparison 10

Comparison example 10 is a multi-layer compressed bottle which is made in a way similar to the compressed bottle of the sixth embodiment. The outer-most layer is Sholex 5003. The middle layers are Admer HB030, Eval EP-E, and Admer LF500. The inner-most layer is Hi-Milan 1652 (an Ionomer, made by Du Pont Mitsui-Polychemicals Co., Ltd.).

Comparison 11

Comparison example 11 is a three-layer compressed bottle which is made in a way similar to the compressed bottle of the sixth embodiment. The outer-most layer is Sholex 5003. The middle layer is Admer AT. The inner-most layer is J-125 (it is crystalline, its intrinsic viscosity ( ) is 0.77, its Tg value is 78° C., polyethyleneterephthalate, made by Mitsui Pet Ltd.).

Comparison 12

Comparison example 12 is a compressed bottle made of a non-crystalline polyester resin. The non-crystalline polyester resin has a Tg value of 81° C. and includes terephthalic acid, ethyleneglycol, and cyclohexanedimethanol in a mole ratio of 100:72:28. The content volume of the compressed bottle is 300 ml and the thickness of its body is 600 μm.

A direct blow molding machine is used to make the compressed bottle of comparison example 8. First, melted resin is extruded and a cylindrical parison is formed when the cylinder temperature of the extruder is 220° C. Then, the parison is clamped with a mold and compressed air is blown into it.

Comparison 13

In comparison example 13 a non-crystalline polyester resin, which has a Tg value of −5.5° C. and includes terephthalic acid, isophthalic acid, adipic acid, and butyleneglycol in a mole ratio of 55:14:31:100 was used to try and make a compressed bottle, but a parison was not formed and a bottle was not made.

Comparison 14

Comparison example 14 is a mono-layer tube-shaped container which is made in a way similar to the tube-shaped container of the sixteenth embodiment. The mono-layer tube-shaped container is made of Mirason 50 and is 450 μm thick.

Comparison 15

Comparison example 15 is a multi-layer tube-shaped container which is made in a way similar to the tube-shaped container of the ninth embodiment. The layers include Mirason 50, for the outer-most layer which is 350 μm thick / Admer LF500, 50 μm thick / Eval EP-E, for the inner-most layer which is 50 μm thick.

Comparison 16

Comparison example 16 is a multi-layer tube-shaped container which is made in a way similar to the tube-shaped container of the ninth embodiment. The layers include Mirason 50, for the outer-most layer which is 300 μm thick / Admer LF500, 40 μm thick / Eval EP-E, 20 μm thick / Admer LF500, 40 μm thick / Mirason 50, for the inner-most layer which is 40 μm thick.

Comparison 17

In comparison example 17 a 10cm square pouch container is made by stacking two single-layer sheets of Mirason 50, each having a thickness of 80 μm, on each other and heat-sealing three of the edges.

Table 1 shows the oil resistance and flexibility of the blended resins of embodiments 1–5, Comparison examples 1–2 5, and of Mirason 50.

To test oil resistance, the object is melted at 240° C. and immediately cooled to 20° C. to obtain a heat pressed sheet. A test piece (5×23×0.5 mm) is cut out of the heat pressed sheets and its surface is washed with methanol. Then, the test piece is accurately weighed and put into isoparafin at 40° C. for twenty-four hours. Then, the oil component on the surface of the test piece is wiped away with filter paper, the weight of the test piece is accurately measured, the difference in weight, before the test piece is put into isoparafin and after the test piece is put into isoparafin, is calculated, and the result is analyzed.

To test flexibility, the object is melted at 240° C. and immediately cooled to 20° C. to obtain a heat pressed sheet. A test piece (5×23×0.5 mm) is cut out of the heat pressed sheet. The test piece is measured with dynamic viscoelasticity measurement equipment (RSA-II, made by Rheometrics Far East Ltd.) when the frequency is 1Hz at each 3° C. in measurement temperature: −100°–140° C., temperature holding time: 1 minute, strain 0.1%. Then, the measured modulus of storage elasticity is analyzed.

TABLE 1

|  | Oil resistance (%) | | Flexibility | Appearance/ Character | |
| --- | --- | --- | --- | --- | --- |
|  | 40° C. | 50° C. | (dynes/cm$^2$) | 40° C. | 50° C. |
| Embodiment 1 | 0.03 | 0.04 | $1.2 \times 10^{10}$ | no change | no change |
| Embodiment 2 | 0.02 | 0.03 | $1.3 \times 10^{10}$ | no change | no change |
| Embodiment 3 | 0.03 | 0.05 | $4.9 \times 10^{10}$ | no change | no change |
| Embodiment 4 | 0.03 | 0.04 | $1.1 \times 10^{10}$ | no change | no change |
| Embodiment 5 | 0.04 | 0.06 | $8.5 \times 10^{10}$ | no change | no change |
| Comparison 1 | 0.02 | 1.80 | $1.3 \times 10^{10}$ | trnsf | trnsf/ stky |
| Comparison 2 | 0.04 | 0.86 | $1.2 \times 10^{10}$ | trnsf | trnsf/ stky |
| Mirason 50 | 9.2 | 10.3 | $2.8 \times 10^{10}$ | no change | no change |

Note*
Trnsf: Transformed
Stky: Sticky

Tables 2 and 3 show characteristics of embodiments 6–20 and of comparison examples 3–12 and 14–17.

To test pinch off strength, the bottle, which is filled with water and tightly plugged, is conditioned at 5° C. for 24 hours and dropped onto a smooth concrete floor from a height of one meter. The test is repeated a maximum of 10 times. Table 2 shows the results of this test including when the pinched off part is cracked, develops pin-holes, or is broken.

To test heat sealing, the opening of the tube-shaped container is heat sealed with a hand sealer (made by Yokoyama Tadasi Ltd.). The temperature of the heat-sealer is 500° C., the heating time for sealing is 9 seconds and the sealing time is 3 seconds. After sealing, a strip 15 mm wide is cut out of the heat-sealed part. The strip is used to measure the adhesion strength in the heat sealed part by a T-peel test with an Autograph (AT-500B, made by Shimadzu Corp.).

To test oil resistance, the container is filled with oily items [creamy contents including 82% isoparafin (made by Nippon Oil Co., Ltd.), 15% glyceline (86% aq.), 3 % high polymer silicon]. Then, the container is tightly sealed and stored for 3 months in a bath having a constant-moisture of 80% and a constant-temperature of 40° C. Following 3 months of storage, the container is checked for deformation and oil bleeding.

To test squeezing capability, a side of the empty bottle (approximately the central part of the compressed bottle) is pressed on a part of a 10 mm diameter circle with an Autograph. The squeezing capability is determined depending on the dimensions of displacement (collapse) at 1 Kgf in pressure.

TABLE 2

| | Pinch Off strength | Squeezing (mm/1 Kgf) | Oil Resistance | Appearance/Character 40° C. | 50° C. |
|---|---|---|---|---|---|
| Embodiment 6 | no crack | 9.5 | ◉ to ○ | NC | NC |
| Embodiment 7 | no crack | 8.0 | ○ to ◉ | NC | NC |
| Embodiment 8 | no crack | 7.5 | ◉ | NC | NC |
| Embodiment 12 | no crack | 6.5 | ◉ | | |
| Embodiment 13 | no crack | 8.1 | ◉ to ○ | | |
| Embodiment 14 | no crack | 8.5 | ◉ | | |
| Embodiment 15 | no crack | 10.0 | ◉ to ○ | | |
| Embodiment 16 | no crack | 20< | ○ to ◉ | | |
| Embodiment 17 | no crack | 7.2 | ◉ | | |
| Comparison 3 | no crack | 5.0 | ◉ | NC | TRNSF |
| Comparison 4 | no crack | 5.4 | ◉ | NC | TRNSF |
| Comparison 5 | no crack | 20< | X | | |
| Comparison 6 | no crack | 5.5 | Δ | | |
| Comparison 7 | cracked first drop on avg | 3.5 | ◉ | | |
| Comparison 8 | no crack | lrge. Var depdnt.on temp. | ○ to ◉ | | |
| Comparison 9 | no crack | 5.0 | Δ | | |
| Comparison 10 | no crack | 6.5 | X | | |
| Comparison 11 | cracked 2 × avg | 3.5 | ◉ | | |
| Comparison 12 | cracked 2 × avg | 2.5 | ◉ | | |

NOTE:
NC: No Change
TRNSF: Transformed

TABLE 3

| | Sealing Strength (Kgf/15 mm) | Flexibility | oil resistance: deformation (swelling) | oil resistance: bleeding of oil |
|---|---|---|---|---|
| Embodiment 9 | 4.7 | flexible | ◉ to ○ | ◉ |
| Embodiment 10 | 4.2 | flexible | ◉ to ○ | ◉ |
| Embodiment 18 | 4.2 | flexible | ◉ | ○ to ◉ |
| Embodiment 19 | 4.8 | flexible | ◉ | ◉ |
| Comparison 14 | 5.0 | very flexible | X | X |
| Comparison 15 | 0.8 | hard | ◉ | ○ |
| Comparison 16 | 2.8 | slightly hard | X | ○ |

TABLE 4

| | Heat sealing | Flexibility | oil resistance (bleeding of oil) |
|---|---|---|---|
| Embodiment 11 | good | flexible | ○ |
| Embodiment 20 | good | flexible | ○ |
| Comparison 17 | good | flexible | X |

The symbol ◉ in oil resistance (deformation, swelling) means that deformation and swelling by oil are not observed at all.

The symbol ○ in oil resistance (deformation, swelling) means that deformation and swelling by oil are hardly observed.

The symbol Δ in oil resistance (deformation, swelling) means that deformation and swelling by oil are observed.

The symbol X in oil resistance (deformation, swelling) means that substantial deformation and swelling by oil are observed.

The symbol ○ in oil resistance (bleeding of oil) means that oil bleeding to the surface is not observed at all.

The symbol Δ in oil resistance (bleeding of oil) means that oil bleeding to the surface is partially observed.

The symbol X in oil resistance (bleeding of oil) means that a large amount of oil bleeds to the surface and the surface is sticky.

The results show that the resin composition of this invention is a suitable component of a container which has superior oil resistance and is not deformed or swelled when storing oily materials. Additionally, the results show that the resin composition of this invention is very flexible, has superior squeezing capability, and superior pinch off adhesion and heat sealing capability.

What is claimed is:

1. A vessel comprising an inner layer, wherein said inner layer is a blended resin composition comprising: at least one kind of a first polyester resin selected from the group consisting of amorphous polyester resins and polyester resins having a peak area of not more than 20 mJ/g by differential scanning calorimeter measurement, which has a glass-transition temperature not less than 50° C. and at least one kind of a second polyester resin which has a glass-transition temperature not more than 40° C.;

said first polyester resin having a peak A representing a temperature dependency of tan δ which is obtained by dynamic viscoelasticity measurement;

said second polyester resin having a peak B representing said temperature dependency of tan δ which is obtained by dynamic viscoelasticity measurement;

said peak A of said first polyester resin is located at a higher temperature than said peak B of said second polyester resin;

said blended resin composition having a peak A' representing a temperature dependency of tan δ which is obtained by dynamic viscoelasticity measurement and a peak B' representing a temperature dependency of tan δ which is obtained by dynamic viscoelasticity measurement;

said peak A' and peak B' of said blended resin composition are located at a lower temperature than said peak A; and said peak A' and peak B' of said blended resin composition are located at a higher temperature than said peak B.

2. The vessel according to claim 1, wherein:

said blended resin composition includes 10 to 95 parts by weight of said first polyester resin and 90 to 5 parts by weight of said second polyester resin.

3. The vessel according to claim 1, wherein:

said peak B' of said blended resin composition is located at a lower temperature than room temperature; and said peak A' of said blended resin composition is located at a higher temperature than room temperature.

4. The vessel according to claim 1, wherein:

said first polyester resin is a polyester containing a combination of acid and glycol components where said acid component is selected from tere- or isophthalic acids and said glycol component is selected from ethylene glycol or cyclohexane dimethanol.

5. The vessel according to claim 1, wherein:

said second polyester resin is polyester containing a combination of acid and glycol components where said acid component is selected from terephthalic acid, isophthalic acid, succinic acid, glutaric acid, adipic acid, pimelic acid, suberic acid, azelaic acid, sebacic acid, nonamethylenedicarboxylic acid, cyclobutanedicarboxylic acid, cyclopentanedicarboxylic acid, cyclohexanedicarboxylic acid, and at least one kind of glycol component selected from the group consisting of ethyleneglycol, diethyleneglycol, propyleneglycol, butyleneglycol, 1,6-hexanediol, neopentylglycol, polyethyleneglycol, polytetramethyleneglycol and cyclohexanedimethanol.

6. The vessel according to claim 1, wherein said inner layer has a thickness of 5 μm to 100 μm.

7. The vessel according to claim 1, wherein said inner layer has a thickness of 20 μm to 100 μm.

8. The vessel according to claim 1, further comprising a gas barrier resin layer.

9. The vessel according to claim 1, wherein said gas barrier resin layer has a thickness less than 100 μm.

10. The vessel according to claim 1, further comprising an outer layer.

11. The vessel according to claim 10, wherein said outer layer is a polyolefin-type resin selected from the group consisting of low density polyethylene resin, linear chain low density polyethylene resin, high density polyethylene resin, homopolypropylene, block co-polypropylene, and random co-polypropylene.

12. The vessel according to claim 10, wherein said outer layer has a thickness of 300 μm to 450 μm.

13. The vessel according to claim 1, further comprising an adhesive resin layer.

14. The vessel according to claim 13, wherein said adhesive resin layer has a thickness of 20 μm to 50 μm.

15. The vessel according to claim 1, further comprising an adhesive resin layer and an outer layer.

* * * * *